Patented Apr. 16, 1929.

1,709,292

UNITED STATES PATENT OFFICE.

HERMANN WAGNER, OF BAD-SODEN-ON-THE-TAUNUS, GERMANY, ASSIGNOR TO GRAS-SELLI DYESTUFF CORPORATION, OF NEW YORK, N. Y., A CORPORATION OF DELAWARE.

WATER-SOLUBLE DINITROARYLAMINO-DIARYLAMINES AND PROCESS OF PREPARING SAME.

No Drawing. Application filed October 10, 1927, Serial No. 225,395, and in Germany October 18, 1926.

My present invention relates to water-soluble dinitroarylaminodiarylamines and process for preparing the same.

I have found that valuable dinitroarylaminodiarylamine dyestuffs are obtained by condensing p-aminodiphenylamine, including its homologues and substitution products, with dinitro-halogen aryls of the following constitution:

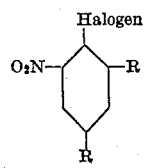

wherein R stands for one of the groups: COOH, COO-metal, COO-alkyl,

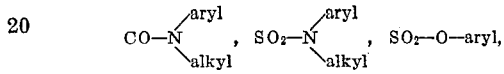

but one R represents a nitro group.

The dyestuffs obtainable by my new process dye animal fibers yellow to reddish-brown tints and are for the most part particularly distinguished by the fact that they yield also fast dyeings on cellulose esters and cellulose ethers.

The condensation may be effected in any solvent, such as for instance in water, alcohol, pyridine, notrobenzene with or without the addition of an acid-binding agent, such as sodium acetate, chalk or the like.

The following examples serve to illustrate my invention, but they are not intended to limit it thereto, the parts being parts by weight:

1. 278 parts of 4-aminodiphenylamine-4'-methyl-2-sulfonic acid are introduced into water, while stirring, and adding some chalk thereto. To the mass are then added 371,5 parts of

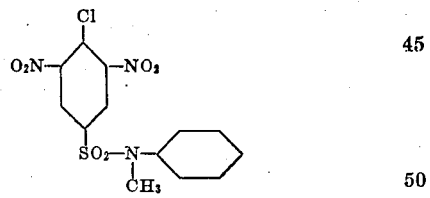

and the whole is heated for 2–3 hours to about 80° C. to 90° C. After cooling, the product of the reaction is converted in the usual manner into its sodium salt and can be recrystallized from water; it forms a brown powder which dyes wool a beautiful brown tint and has the following formula:

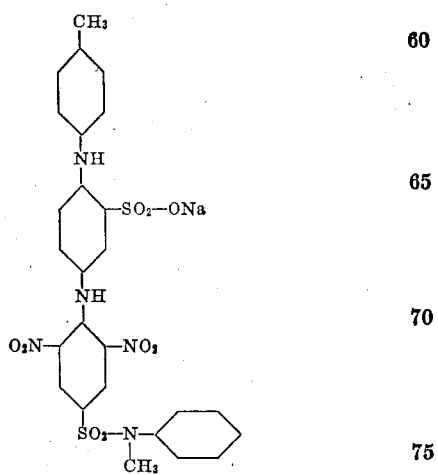

2. Molecular proportions of 4-aminodiphenylamine-2-sulfonic acid and 4-chlor-3.5-dinitro-1-benzoic acid are caused to act upon each other in the manner indicated in Example 1. The dyestuff thus obtained also crystallizes from water and is distinguished by the excellent fastness of its yellowish-brown dyeings on wool. It has the following formula:

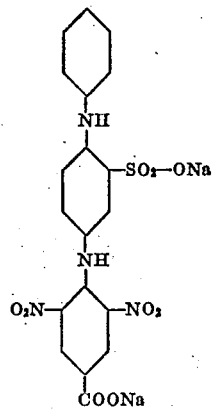

Instead of the 4-chlor-3.5-dinitro-1-benzoic acid there may also be used an ester, for instance methyl ester.

3. The dyestuff prepared in the manner set forth in the foregoing examples from p-aminodiphenylamine and 4-chlor-3.5-dinitro-1-benzoic acid and having the following formula:

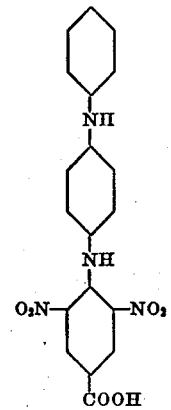

or a metal salt thereof is particularly distinguished by its yielding an intense brown tint on acetyl cellulose.

When proceeding in the manner indicated in the foregoing examples and working under similar conditions, the dyestuffs represented by the following formulae are obtained

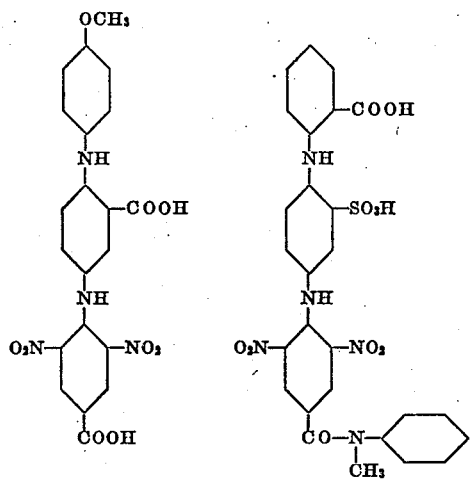

and so on wherein however one of the acid groups is in the form of a salt, which dyestuffs give on the animal fibers a wide range of brown tints and also partly yield intense dyeings on cellulose-esters and cellulose-ethers.

In the following claims the term any "p-aminodiphenylamine" is to be understood to comprise the homologues and derivatives of this compound.

I claim:

1. The process of preparing water-soluble dinitroarylamino-diarylamines, which consists in causing any p-aminodiphenylamine and a dinitrohalogenaryl of the following general formula:

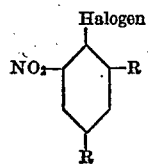

wherein R stands for COOH, COO-metal, COO-alkyl,

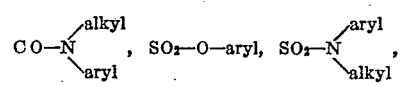

but one R represents a nitro group, to act upon each other in the presence of a solvent.

2. The process of preparing water-soluble dinitroaryl-amino-diarylamines, which consists in causing any p-aminodiphenyl-amine and a dinitrohalogenaryl of the following general formula:

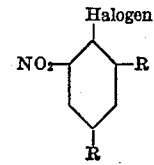

wherein R stands for COOH, COO-metal, COO-alkyl,

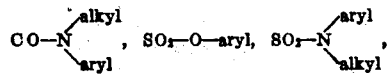

but one R represents a nitro group, to act upon each other in the presence of an acid-binding agent and a solvent.

3. The process of preparing water-soluble dinitroaryl-amino-diarylamines, which consists in causing any p-aminodiphenylamine and a dinitro-halogenaryl of the following general formula:

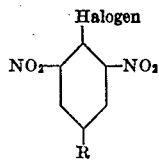

wherein R stands for COOH, COO-metal, COO-alkyl,

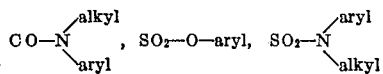

to act upon each other in the presence of an acid-binding agent and a solvent.

4. The process of preparing water-soluble dinitroaryl-amino-diarylamines, which consists in causing any p-aminodiphenylamine and a dinitrohalogenaryl of the following general formula:

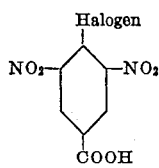

to act upon each other in the presence of an acid-binding agent and a solvent.

5. The process of preparing water-soluble dinitroarylamino-diarylamines, which consists in causing any p-aminodiphenylamine and a dinitrohalogenaryl of the following general formula:

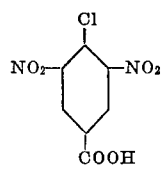

to act upon each other in the presence of an acid-binding agent and a solvent.

6. The process of preparing water-soluble dinitroaryl-amino-diarylamines, which consists in causing a compound of the following formula:

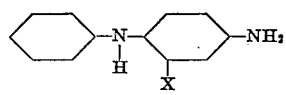

wherein X stands for hydrogen or a sulfo group and a dinitro-halogenaryl of the following general formula:

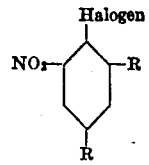

wherein R stands for COOH, COO-metal, COO-alkyl,

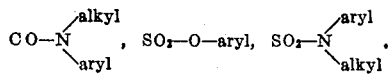

but one R represents a nitro group to act upon each other in the presence of an acid-binding agent and a solvent.

7. The process of preparing water-soluble dinitroaryl-amino-diarylamines, which consists in causing a compound of the following formula:

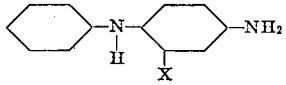

wherein X stands for hydrogen or a sulfo group and a dinitro-halogenaryl of the following general formula:

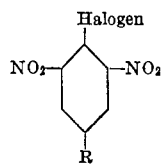

wherein R stands for COOH, COO-metal, COO-alkyl,

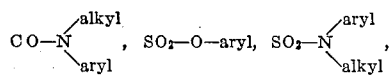

to act upon each other in the presence of an acid-binding agent and a solvent.

8. The process of preparing water-soluble dinitroaryl-amino-diarylamines, which consists in causing a compound of the following formula:

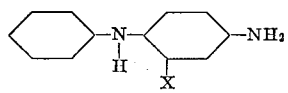

wherein X stands for hydrogen or a sulfo group and a dinitro-halogenaryl of the following general formula:

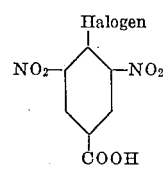

to act upon each other in the presence of an acid-binding agent and a solvent.

9. The process of preparing water-soluble dinitroaryl-amino-diarylamines, which consists in causing a compound of the following general formula:

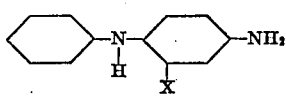

wherein X stands for hydrogen or a sulfo group and a dinitro-halogenaryl of the following general formula:

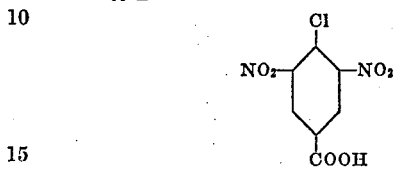

to act upon each other in the presence of an acid-binding agent and a solvent.

10. The process of preparing water-soluble dinitroaryl-amine-diarylamines, which consists in causing 4-aminodiphenyl-amino-2-sulfonic acid of the following formula:

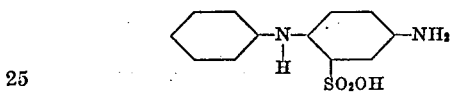

and a dinitro-halogenaryl of the following general formula:

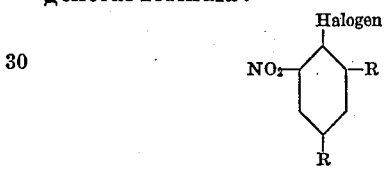

wherein R stands for COOH, COO-metal, COO-alkyl,

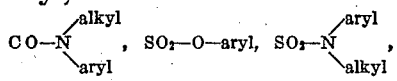

but one R represents a nitro group to act upon each other in the presence of an acid-binding agent and a solvent.

11. The process of preparing water-soluble dinitroaryl-amino-diarylamines, which consists in causing 4-amino-diphenylamine-2-sulfonic acid of the following formula:

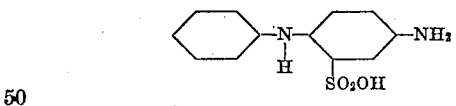

and a dinitro-halogenaryl of the following general formula:

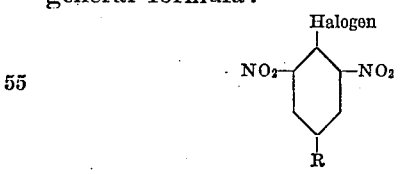

wherein R stands for COOH, COO-metal, COO-alkyl,

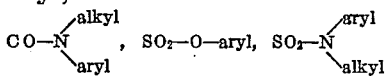

to act upon each other in the presence of an acid-binding agent and a solvent.

12. The process of preparing water-soluble dinitroaryl-amino-diarylamines, which consists in causing 4-amino-diphenyl-amine-2-sulfonic acid of the formula:

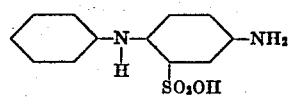

and a dinitro-halogenaryl of the following general formula:

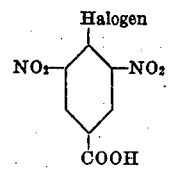

to act upon each other in the presence of an acid-binding agent and a solvent.

13. The process of preparing water-soluble dinitro-aryl-amino-diarylamines, which consists in causing 4-amino-diphenylamine-2-sulfonic acid of the formula:

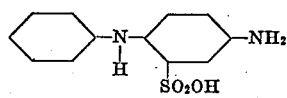

and a dinitro-halogenaryl of the following general formula:

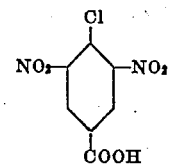

to act upon each other in the presence of water and sodium acetate.

14. As new products, the compounds of the following formula:

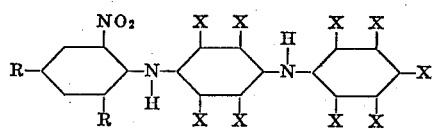

wherein X stands for any substituent; R for COOH, COO-metal, COO-alkyl,

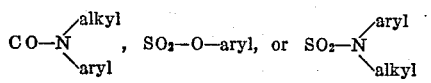

and one R represents a nitro group, said compounds being water-soluble dyestuffs, dyeing animal fibers reddish-brown tints and partly giving fast dyeings on cellulose ethers and cellulose esters.

15. As new products, the compounds of the following formula:

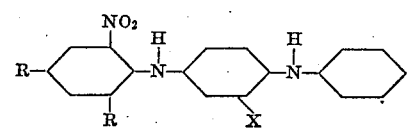

wherein X stands for hydrogen or a sulfo group and R stands for COOH, COO-metal, COO-alkyl,

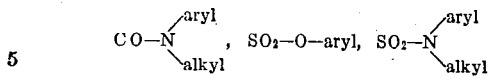

but one R represents a nitro group, said compounds being water-soluble dyestuffs, dyeing animal fibers reddish-brown tints and partly giving fast dyeings on cellulose-ethers and cellulose-esters.

16. As new products, compounds which have most probably the following formula:

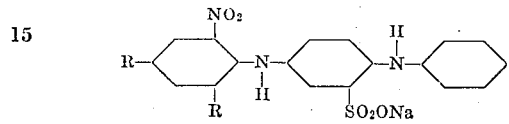

wherein R stands for COOH, COO-metal, COO-alkyl,

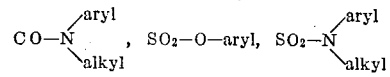

but one R represents a nitro group, said compounds being water-soluble dyestuffs, dyeing animal fibers reddish-brown tints and partly giving fast dyeings on cellulose-ethers and cellulose-esters.

17. As new products, compounds which have most probably the following formula:

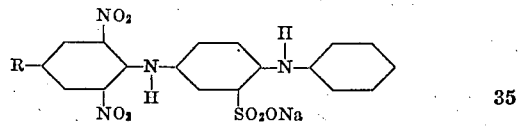

wherein R stands for COOH, COO-metal, COO-alkyl,

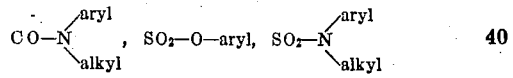

said compounds being water-soluble dyestuffs, dyeing animal fibers reddish-brown tints and partly giving fast dyeings on cellulose-ethers and cellulose-esters.

18. As a new product, the compound which has most probably the following formula:

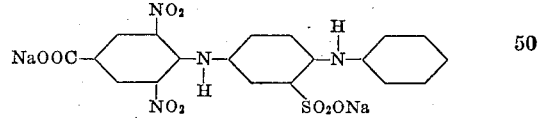

being a dyestuff recrystallizable from water which is distinguished by the great fastness of its yellowish-brown dyeing on wool.

In testimony whereof, I affix my signature.

HERMANN WAGNER.